United States Patent
Litwinowicz et al.

(10) Patent No.: US 10,370,096 B2
(45) Date of Patent: Aug. 6, 2019

(54) ROTOR PHASE CONTROL

(71) Applicant: Sikorsky Aircraft Corporation, Stratford, CT (US)

(72) Inventors: Anthony Litwinowicz, Derby, CT (US); Kenneth S. Wittmer, Sandy Hook, CT (US); Matthew T. Luszcz, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 180 days.

(21) Appl. No.: 15/301,142

(22) PCT Filed: Apr. 2, 2014

(86) PCT No.: PCT/US2014/032649
§ 371 (c)(1),
(2) Date: Sep. 30, 2016

(87) PCT Pub. No.: WO2015/152912
PCT Pub. Date: Oct. 8, 2015

(65) Prior Publication Data
US 2017/0021922 A1    Jan. 26, 2017

(51) Int. Cl.
*B64C 27/54* (2006.01)
*B64C 27/57* (2006.01)
*B64C 13/16* (2006.01)
*B64C 27/72* (2006.01)
*B64C 27/10* (2006.01)
*B64C 27/32* (2006.01)

(52) U.S. Cl.
CPC ............. *B64C 27/57* (2013.01); *B64C 13/16* (2013.01); *B64C 27/10* (2013.01); *B64C 27/32* (2013.01); *B64C 27/72* (2013.01); *B64C 2027/7205* (2013.01); *Y02T 50/34* (2013.01)

(58) Field of Classification Search
None
See application file for complete search history.

(56) References Cited

U.S. PATENT DOCUMENTS

| 5,853,152 A | 12/1998 | Evans et al. |
| 7,600,976 B2 | 10/2009 | Bagai et al. |

(Continued)

FOREIGN PATENT DOCUMENTS

| GB | 1519380 | 7/1978 |
| WO | 2009126626 A2 | 10/2009 |
| WO | 2014025444 A2 | 2/2014 |

OTHER PUBLICATIONS

International Search Report and Written Opinion for International Application No. PCT/US14/32649, dated Aug. 19, 2014, ISR 7 Pages.

(Continued)

*Primary Examiner* — John Olszewski
*Assistant Examiner* — Gerrad A Foster
(74) *Attorney, Agent, or Firm* — Cantor Colburn LLP

(57) ABSTRACT

Embodiments are directed to obtaining data from at least one sensor, processing, by a processor, the data to determine an independent rotor phase lag for each of a plurality of axes associated with a rotorcraft, and issuing, by the processor, at least one command to provide for on-axis moments in accordance with the independent rotor phase lag for each of the axes.

20 Claims, 2 Drawing Sheets

(56) References Cited

U.S. PATENT DOCUMENTS 7,930,074 B2 * 4/2011 Cherepinsky ........ G05D 1/0858
244/17.11
2012/0298791 A1 11/2012 Yamamoto
2013/0304400 A1 11/2013 Isom et al.

OTHER PUBLICATIONS

International Search Report and Written Opinion for International Application No. PCT/US14/32649, dated Aug. 19, 2014, WO 5 Pages.
Extended European Search Report for Application No./Patent No. 14888447.1-1754/3126225, dated Nov. 17, 2017 (9 pp.)
International Preliminary Report on Patentability for International Application No. PCT/US2014/032649, dated Oct. 4, 2016 (6 pp.)

* cited by examiner

ROTOR PHASE CONTROL

CROSS REFERENCE TO RELATED APPLICATIONS

This application is a National Phase Application of Patent Application PCT/US2014/032649 filed on Apr. 2, 2014, the contents of which are incorporated herein by reference in their entirety.

BACKGROUND

On an aircraft, such as a rotorcraft, rigid rotor design is typically associated with a small amount of rotor phase lag, that is, the time between the feathering of a blade and the resulting moment is small when compared to a traditional rotor system where approximately 90 degrees of phase lag is expected.

Analysis of a rigid rotor system has shown that the rotor phase lag can vary significantly with speed. In addition to varying with speed, feathering commands introduced at different positions around the rotor will generate moments at different rates. This means that phase lag varies around the rotor as well. As a result, it is difficult to ensure correct on-axis commands for pitching and rolling maneuvers. For the particular case of a coaxial rotor, differential cyclic commands may result in off-axis net moments, and gang cyclic commands may result in undesirable inter-hub moments.

BRIEF SUMMARY

An embodiment is directed to a method comprising: obtaining data from at least one sensor, processing, by a processor, the data to determine an independent rotor phase lag for each of a plurality of axes associated with a rotorcraft, and issuing, by the processor, at least one command to provide for on-axis moments in accordance with the independent rotor phase lag for each of the axes.

An embodiment is directed to an apparatus comprising: at least one processor, and memory having instructions stored thereon that, when executed by the at least one processor, cause the apparatus to: obtain data from a plurality of sensors, process the data to determine an independent rotor phase lag for each of a plurality of axes associated with a rotorcraft, and issue commands to provide for on-axis moments in accordance with the independent rotor phase lag for each of the axes.

An embodiment is directed to a rotorcraft comprising: at least one rotor comprising a plurality of blades, a plurality of sensors associated with the at least one rotor, and a control system configured to: obtain data from the sensors, process the data to determine an independent rotor phase lag for each of a plurality of axes associated with the rotorcraft, and issue commands to provide for on-axis moments in accordance with the independent rotor phase lag for each of the axes.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
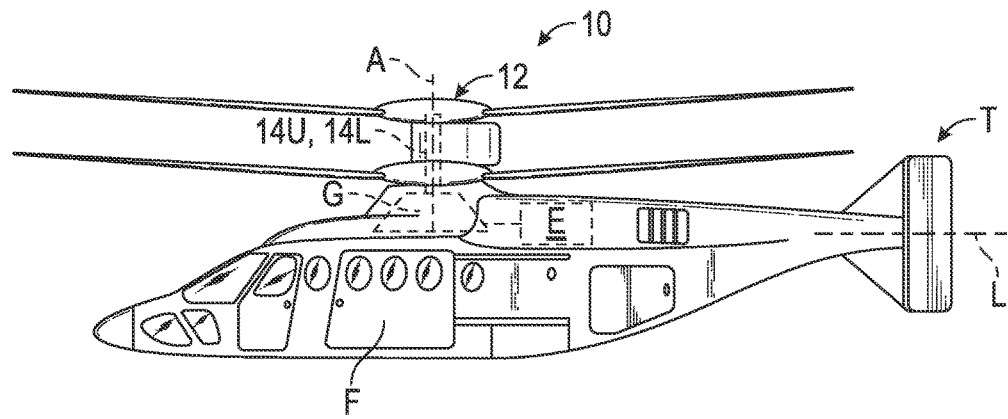
FIG. 1A is a general perspective side view of an exemplary rotary wing aircraft.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for ensuring correct on-axis commands for an aircraft (e.g., a rotorcraft, such as a helicopter) by adjusting the phasing of kinematics for each axis separately or independently to obtain an on-axis response. In some embodiments, such adjustments may be based on one or more tables or maps.

FIG. 1A illustrates an exemplary rotary wing aircraft 10. The aircraft 10 is shown as having a dual, counter-rotating main rotor system 12, which rotates about a rotating main rotor shaft 14U, and a counter-rotating main rotor shaft 14L, both about an axis of rotation A. Other types of configurations may be used in some embodiments, such as a single rotor system 12.

The aircraft 10 includes an airframe F which supports the main rotor system 12 as well as an optional translational thrust system T which provides translational thrust during high speed forward flight, generally parallel to an aircraft longitudinal axis L.

A main gearbox G located above the aircraft cabin drives the rotor system 12. The translational thrust system T may be driven by the same main gearbox G which drives the rotor system 12. The main gearbox G is driven by one or more engines E. As shown, the main gearbox G may be interposed between the engines E, the rotor system 12, and the translational thrust system T.

Figure 1B:
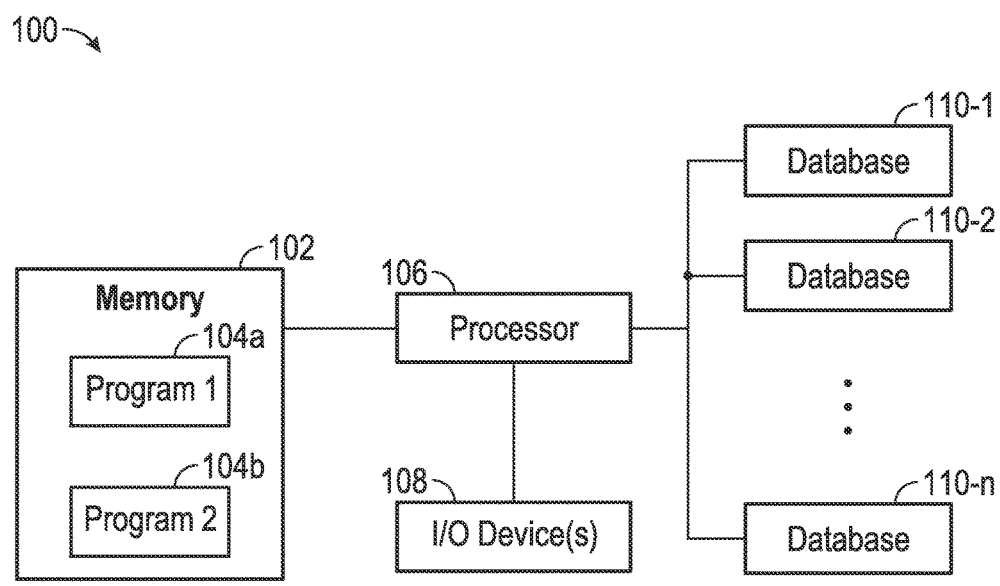
FIG. 1B is a schematic block diagram illustrating an exemplary computing system.

Referring to FIG. 1B, an exemplary computing system 100 is shown. Computing system 100 may be part of a flight control system of the aircraft 10. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1B as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), etc. The I/O device(s) 108 may be configured to provide an interface to allow a user to interact with the system 100.

As shown, the processor 106 may be coupled to a number 'n' of databases, 110-1, 110-2, . . . 110-n. The databases 110 may be used to store data, such as data obtained from one or more sensors (e.g., accelerometers). In some embodiments, the data may pertain to one or more physical parameters, such as advance ratio and air density.

The system 100 is illustrative. In some embodiments, one or more of the entities may be optional. In some embodiments, additional entities not shown may be included. In some embodiments, the entities may be arranged or organized in a manner different from what is shown in FIG. 1B. For example, in some embodiments, the memory 102 may be coupled to or combined with one or more of the databases 110.

Figure 2:
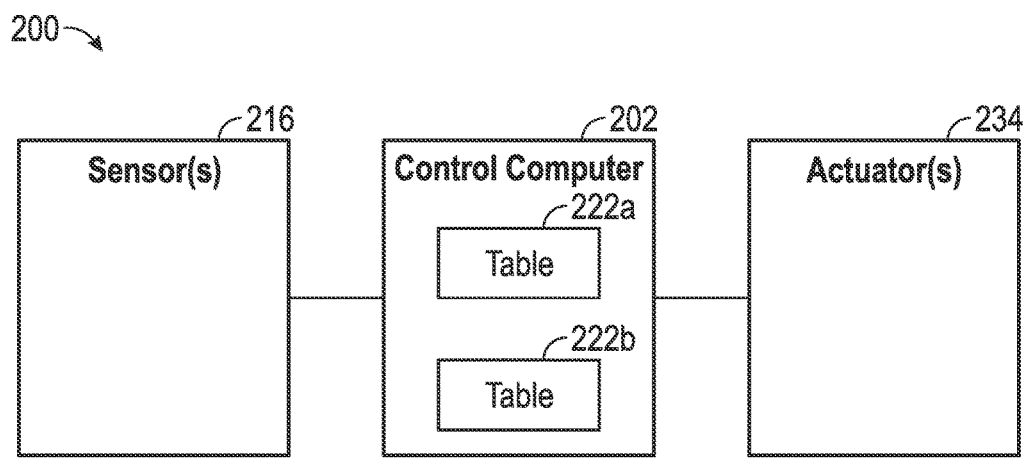
FIG. 2 is a block diagram of an exemplary system environment.

Referring to FIG. 2, a system 200 in accordance with one or more embodiments is shown. The system 200 may be implemented in connection with one or more of the components or devices described above in relation to the system 100. The system 200 may be used to correct on-axis commands by independently adjusting phasing kinematics for one or more axes. The system 200 may be built off of, or adopt principles of, a fly-by-wire (FBW) system with an electronic mixer.

The system 200 may include a control computer 202, such as a flight control computer (FCC). The control computer 202 may be coupled to one or more sensors 216. The sensors 216 may be configured to measure one or more parameters, such as temperature, pressure, density, speed (e.g., vertical speed), advance ratio, etc. Such parameters may be measured during flight of an aircraft.

The control computer 202 may include one or more schedules, maps, or tables, such as a first table 222a and a second table 222b. As described above, in some embodiments on-axis commands may be provided by adjusting a phasing of kinematics for each axis separately to obtain an on-axis response. In some embodiments, a separate table 222 may be created for each of one or more axes (e.g., pitch, roll) that maps out the phase lag needed to generate correct on-axis moments at varying airspeeds.

The tables 222 may be used so that control inputs going through kinematics generate correct on-axis moments. The tables 222 may be populated based upon a model or type of rotor that is used on a given aircraft platform. Values for the tables 222 may be determined based on flight testing.

The tables 222 may map parameters or sensor values (e.g., values obtained from the sensors 216) to one or more commands to generate on-axis moments or responses. The control computer 202 may issue the commands to one or more actuators 234 to provide for such on-axis moments. In some embodiments, the commands issued by the control computer 202 may correspond to orthogonal cyclic commands. The commands may be orthogonal if phasing is the same for pitch and roll axes. If phasing is different for the pitch and roll axes, non-orthogonal cyclic commands may be provided. The commands may be associated with a swashplate.

In some embodiments, individual blade control (e.g., individual blade pitch around azimuth) may be provided via the commands.

The system 200, or portions thereof, may correspond to an electronic control system. In some embodiments, an analogous mechanical control system may be used.

Figure 3:
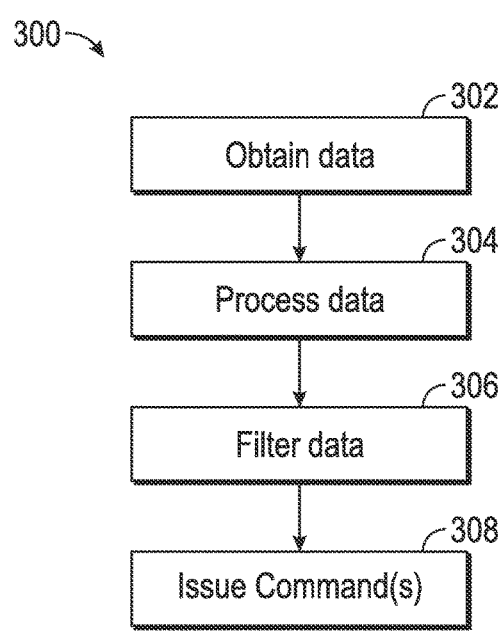
FIG. 3 illustrates a flow chart of an exemplary method.

Turning now to FIG. 3, a flow chart of an exemplary method 300 is shown. The method 300 may be executed by one or more systems, components, or devices, such as those described herein (e.g., the system 100 and/or the system 200). The method 300 may be used to robustly and accurately provide for flight controls in order to obtain an on-axis response from an aircraft.

In block 302, data associated with the operation of the aircraft may be obtained from one or more sensors (e.g., sensors 216). The data may pertain to one or more parameters, such as environmental parameters.

In block 304, the data of block 302 may be processed. For example, the data may be processed by the control computer 202. The data may be processed in accordance with one or more tables (e.g., tables 222).

In block 306, the processed data of block 304 may be filtered. The filtering may be done to remove extraneous data, to reduce the impact of noise on one or more measurements, or to obtain a data profile that more closely mirrors or resembles the physical world.

In block 308, one or more commands or directives may be issued. The commands may represent a phase shift relative to traditional on-axis commands in such a way that control inputs going through kinematics may generate correct on-axis moments. The commands may be issued independently, or that is to say, that the commands may correspond to different axes of the aircraft. The commands may be used to adjust rotor phasing separately for each axis.

The method 300 is illustrative. In some embodiments, one or more of the blocks or operations (or a portion thereof) may be optional. In some embodiments, additional blocks or operations not shown may be included. In some embodiments, the blocks or operations may be executed in an order or sequence that is different from what is shown.

As described herein, embodiments of the disclosure may be used to generate correct or proper on-axis moments through separate phase scheduling of each command axis. Traditional mixing may provide an ability to mix-in a command from a first axis to offset its expected effect on one or more additional axes. Embodiments of the disclosure may be used to adjust rotor phasing separately for one or more axes as the rotor phasing changes with, e.g., one or more parameters, in order to provide corrected kinematics for on-axis moment generation. Embodiments of the disclosure may prevent off-axis moments from being generated due to differential cyclic commands, or inadvertent inter-hub moments from being generated due to gang cyclic commands in coaxial applications.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method of adjusting phasing of a rotor comprising:
obtaining data from at least one sensor;
processing, by a processor, the data to determine an independent rotor phase lag for each of a plurality of axes associated with the rotor of a rotorcraft, wherein the data is mapped to commands via a table;
issuing, by the processor, at least one command to one or more actuators to provide for on-axis moments in accordance with the independent rotor phase lag for each of the axes; and
adjusting phasing of the rotor separately for each of the plurality of axes via operation of the one or more actuators.

2. The method of claim 1, wherein the data pertains to at least one of: temperature, pressure, density, speed, and advance ratio.

3. The method of claim 1, wherein the plurality of axes comprises a pitch axis and a roll axis of the rotorcraft.

4. The method of claim 1, wherein the data is processed using at least one table that maps parametric data to rotor phase lag values.

5. The method of claim 4, wherein the at least one table is populated based on a configuration of the rotor that is used on the rotorcraft.

6. The method of claim 4, wherein the at least one table is populated based on flight testing.

7. The method of claim 1, wherein the at least one command corresponds to a cyclic command associated with a swashplate.

8. The method of claim 1, wherein the at least one command provides for individual blade control.

9. An apparatus comprising:
at least one processor; and
a memory having instructions stored thereon that, when executed by the at least one processor, cause the apparatus to:
obtain data from a plurality of sensors;
process the data to determine an independent rotor phase lag for each of a plurality of axes associated with a rotor of a rotorcraft; and
issue commands to one or more actuators to provide for on-axis moments in accordance with the independent rotor phase lag for each of the axes such that a phase of the rotor is adjusted separately for each of the plurality of axes via the one or more actuators.

10. The apparatus of claim 9, wherein the data pertains to at least two of: temperature, pressure, density, speed, and advance ratio.

11. The apparatus of claim 9, wherein the plurality of axes comprises a pitch axis and a roll axis of the rotorcraft.

12. The apparatus of claim 9, wherein the memory has at least one table stored thereon that maps parametric data to rotor phase lag values, and wherein the apparatus is configured to process the data in accordance with the at least one table.

13. The apparatus of claim 12, wherein values of the at least one table are populated based on a configuration of the rotor that is used on the rotorcraft.

14. The apparatus of claim 12, wherein values of the at least one table are populated based on flight testing.

15. The apparatus of claim 9, wherein the commands correspond to orthogonal cyclic commands associated with a swashplate when phasing is the same for each of the axes.

16. The apparatus of claim 9, wherein the commands provide for individual blade control.

17. A rotorcraft comprising:
at least one rotor comprising a plurality of blades;
a plurality of sensors associated with the at least one rotor; and
a control system configured to:
obtain data from the sensors;
process the data to determine an independent rotor phase lag for each of a plurality of axes associated with the at least one rotor of the rotorcraft; and
issue commands to one or more actuators to provide for on-axis moments in accordance with the independent rotor phase lag for each of the axes such that a phase of the at least one rotor is adjusted separately for each of the plurality of axes via the one or more actuators.

18. The rotorcraft of claim 17, wherein the data pertains to advance ratio and air density, and wherein the plurality of axes comprises a pitch axis and a roll axis of the rotorcraft.

19. The rotorcraft of claim 17, wherein the control system is an electronic control system.

20. The rotorcraft of claim 17, wherein the control system comprises a control computer configured to process the data by accessing at least one table that maps a phase lag needed to generate on-axis moments for each of the axes at varying airspeeds.

* * * * *